Nov. 9, 1943.    A. RAPPL    2,334,031

WINDOW OPERATING MECHANISM FOR AUTOMOBILES

Filed Dec. 5, 1940

INVENTOR
ANTON RAPPL
BY
Beau, Brooks, Buckley & Beau.
ATTORNEYS

Patented Nov. 9, 1943

2,334,031

UNITED STATES PATENT OFFICE 2,334,031

WINDOW OPERATING MECHANISM FOR AUTOMOBILES

Anton Rappl, Buffalo, N. Y., assignor to Trico Products Corporation, Buffalo, N. Y.

Application December 5, 1940, Serial No. 368,653

4 Claims. (Cl. 137—144)

This invention relates to a window system for motor vehicles and particularly to automatic means for raising and lowering one or more of the several windows.

It has heretofore been proposed to operate a window by means of fluid or air pressure acting on a piston of a fluid motor, communication between the motor and the source of fluid pressure being established through suitable valve means.

An object of the present invention is to provide a system for the control of the several windows of the vehicle whereby the driver of the vehicle may selectively operate the various windows at will. A further aim of the invention is to provide a window system in which the window at the side of the driver is controlled by means independent of the selective control means so as to facilitate the opening of the same expeditiously, as for the giving of a required signal in heavy traffic.

In the drawing

Figure 1:
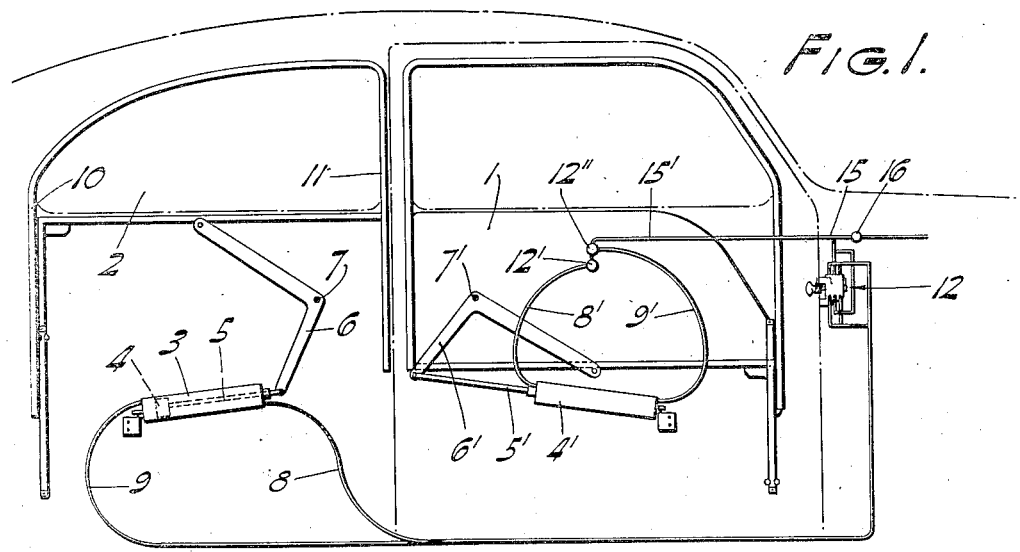
Fig. 1 is a diagrammatic illustration of a vehicle equipped with the window system of the present invention.

In proceeding in accordance with the present invention the window at the driver's side of the vehicle is indicated by the numeral 1 while the remaining windows of the vehicle are generally indicated by the numeral 2, such remaining windows including the right front window and the two rear side windows. Each of the remaining windows is operated by a motor, such as that illustrated, which comprises a cylinder 3 and a piston 4, the piston rod 5 being connected to one arm of a bell crank 6, which is pivoted at 7, while the opposite end of the bell crank is connected to the slidable window 2 so that when fluid pressure is operatively applied to the motor, as by means of conduits 8 and 9, the window will be moved in its guideways 10 and 11 accordingly. Each fluid motor of the three window mechanisms is connected by the conduits 8 and 9 to the central or selective control, generally indicated by the numeral 12.

Figure 2:
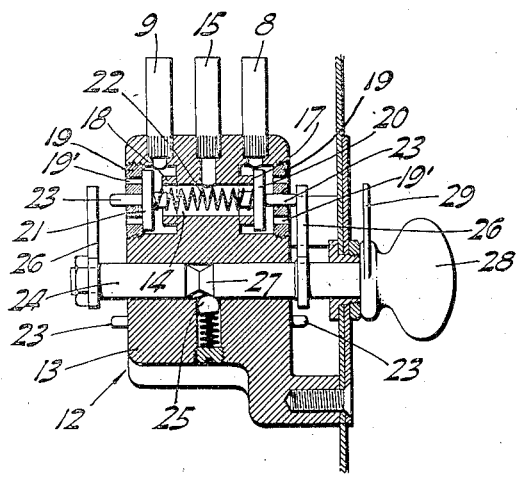
Fig. 2 is a sectional view through the selective control.
Figure 3:
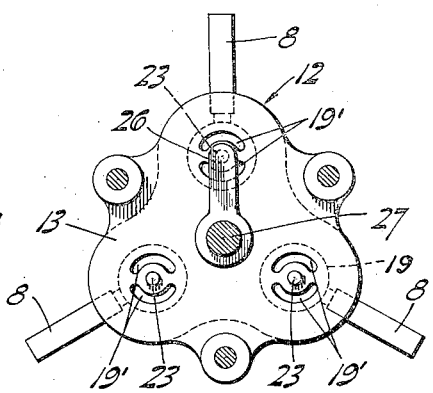
Fig. 3 is an elevation of the control unit with parts shown in section.
Figure 4:
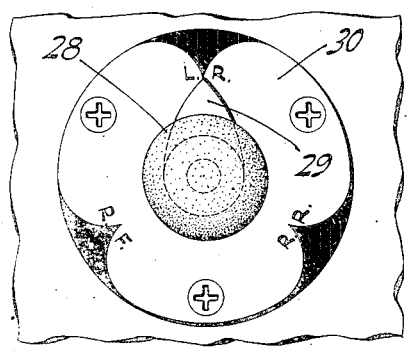
Fig. 4 is an elevation of the unit as it appears on the instrument board of the vehicle.

As shown in Fig. 2, this fluid control may embody a body 13 having a chamber 14 for each window mechanism. This chamber is connected by a conduit 15 through a check valve 16 (Fig. 1) to a source of pressure, preferably suction, such as the intake manifold of a vehicle power plant. Communication between the chamber 14 and the conduit 8 is established through a valve seat 17 and between the chamber 14 and the conduit 9 through a seat 18. Opposite each valve seat is an atmospheric seat 19 having a vent or port 19', and a valve 20 is interposed between the seats 17 and 19, while a similar valve 21 is interposed between the suction seat 18 and its companion atmospheric seat 19. A spring 22 is interposed between the valves 20 and 21 to urge them apart and against their respective atmospheric seats and thereby maintain a constant communication between the suction chamber 14 and both conduits 8 and 9. Therefore, the piston 4 of each fluid motor is normally subjected to the suction at both sides simultaneously.

The several chambers are disposed in a circular series about a selector shaft 24 with the valve stems 23 projecting from the opposite sides of the body. This shaft is journaled for rotative movement and has limited axial movement in the body 13 against the resistance of the spring detent 25 and fixed on this shaft is a pair of selector arms or fingers 26 which are adapted to be brought into registry with the protruding valve stems 23 of any selected chamber. When so positioned the shaft may be shifted in or out to depress the corresponding valve away from the atmospheric seat and close the companion suction port. Such depression of the valve will vent the corresponding side of the air motor to the atmosphere for the establishment of a pressure differential on the piston to effect operation of the window. Upon release of the shaft 24 the spring detent 25 will cam on the proper one of the sloping faces 27 on the shaft to return the latter to its neutral position and release the spring 22 to close the atmospheric vent and thereby re-establish the desired suction connection. The shaft 24 is provided with a hand knob 28 and a point 29 operating over a dial 30 to facilitate the selection of the desired window mechanism.

Since it may be desired to open the driver's window quickly to give a signal, the control for this particular window is rendered more accessible through individual valves 12' and 12" which may be quickly depressed to vent the corresponding end of the motor cylinder 4' to the atmosphere. The valves are connected to the source of suction by the conduit 15' and are of such construction that when the valve 12' is depressed the source of suction through the conduit 8' is interrupted and the corresponding end of the cylinder vented to the atmosphere, resulting in the window's being elevated to its closed position. Upon depressing the valve 12" a reverse action will occur by interrupting the suction communication through the conduit 9' and venting the corresponding end of the cylinder to the atmosphere.

It will therefore be obvious that the motorist will have his window under his immediate control for giving a quick signal and at the same time he will have the remaining windows of the vehicle under his selective control. Furthermore, by simply rotating the hand knob 28 to bring the selector fingers in alignment with the proper valve stems 23 and then pushing in on the knob or pulling it out, as the occasion may require, the selected window will be lifted or lowered.

Since suction is so readily available in the vehicle power plant this subatmospheric air pressure is preferred to a high pressure, but the latter, either gas or liquid, may be used or other types of motors may be used, and while the foregoing description has been given in detail the inventive principles herein involved may obviously be incorporated in other physical embodiments without departing from the spirit and scope of the appended claims.

What is claimed is:

1. In a window system for motor vehicles, a selector control for the individual motors of plural window operators, comprising a body having a series of pressure chambers with valves in each having stems projecting from the opposite sides of the body in groups, and a selector member rotatably supported in the body for selective association with the stems of each group and slidably supported for being pushed or pulled to actuate a predetermined one of the valves.

2. In a window system for motor vehicles, a selector control for the individual motors of plural window operators, comprising a body having a series of pressure chambers with a supply passage and a motor passage separated by a pressure port, a valve adapted to close said port and movable therefrom to close an atmospheric port, resilient means normally holding the valve over the latter port, and a selector shaft having a part positionable over the valve and movable to depress the valve to open the atmospheric port and close the pressure port.

3. In a window system for motor vehicles, a selector control for the individual motors of plural window operators, comprising a body having a series of pressure chambers, a selector shaft slidably and rotatably mounted in the body and extending at opposite ends therefrom, members carried by the extending end portions of the shaft at opposite sides of the body, and valve means in each chamber selectively operable by said members to connect the respective motor for operation to either open or close the desired window.

4. A selector control comprising a body having a series of pressure chambers, each chamber having at its opposite sides seats with passages opening therethrough into valve compartments, each valve compartment having an atmospheric port, a valve in each compartment normally closing the atmospheric port and movable to open the latter and close the passage through the seat, a spring interposed between the valves of each chamber and acting to hold them in their normal position, and a selector control pivoted on the body and having members at opposite sides of the body positionable over the valves of a selected chamber for actuating either associated valve, each chamber having a fluid port for connection to a source of pressure and each compartment having a motor port connectible to a motor.

ANTON RAPPL.